United States Patent [19]
Berkson

[11] Patent Number: 6,049,779
[45] Date of Patent: Apr. 11, 2000

[54] CALL CENTER INCENTIVE SYSTEM AND METHOD

[76] Inventor: Stephen P. Berkson, 15400 Winchester, Suite 47, Los Gatos, Calif. 95030

[21] Appl. No.: 09/055,546

[22] Filed: Apr. 6, 1998

[51] Int. Cl.[7] .................................................... G06F 17/00
[52] U.S. Cl. ................................................. 705/14; 705/1
[58] Field of Search .................................. 705/14, 1, 11; 379/265; 463/29, 28

[56] References Cited

U.S. PATENT DOCUMENTS

| | | | |
|---|---|---|---|
| 5,025,372 | 6/1991 | Burton et al. | 364/406 |
| 5,062,103 | 10/1991 | Davidson et al. | 370/270 |
| 5,239,460 | 8/1993 | LaRoche | 705/11 |
| 5,483,444 | 1/1996 | Heintzemann et al. | 705/5 |
| 5,586,937 | 12/1996 | Menashe | 463/41 |
| 5,608,785 | 3/1997 | Kasday | 379/93.13 |
| 5,689,100 | 11/1997 | Carrithers et al. | 235/380 |
| 5,696,702 | 12/1997 | Skinner et al. | 702/186 |
| 5,779,549 | 7/1998 | Walker et al. | 463/42 |
| 5,864,616 | 1/1999 | Hartmeier | 379/266 |
| 5,907,547 | 5/1999 | Foladare et al. | 370/352 |

OTHER PUBLICATIONS

"Good call," Debra S. Malos, Incentive, vol. 166, No. 11, pp. 80–83, Nov. 1992.
"Dig deeper," Rhonda Cooke, Credit Union Management, vol. 21, n. 3, pp. 37–38, Mar. 1998.
"ClickIn.com," http://www.clickin.com/survey/fr/survey13.html, Mar. 1997 (English translation of relevant prior art found on last page).
"Making telebusiness thrive in the small– mid–sized company," Adrian Miller, Telemarketing & Call Center Solutions, vol. 16, No. 8, pp. 72–74, Feb. 1998.
"Small Telco Telemarketing . . . More," Independent Telco News, vol. 2, No. 21, Nov. 1991.
"Incentives that inspire superior performance," Carolyn J. Mills, Telemarketing Magazine, vol. 11, No. 12, pp. 20–23, Jun. 1993.
Greenfield Online http://www.greenfieldonline.com/, second page, Jun. 1999.

*Primary Examiner*—Allen R. MacDonald
*Assistant Examiner*—Susanna Meinecke-Diaz
*Attorney, Agent, or Firm*—Law Offices of Terry McHugh

[57] ABSTRACT

The invention is a system and method that provides positive incentives to a call center agent by allowing the call center agent to play a game each time an established performance parameter standard is met. In accordance with the invention, a data collection system monitors a performance parameter of a telephone call handled by a call center agent. A game participation system compares an evaluation of the monitored performance parameter to an established performance parameter standard and allows the call center agent to participate in a game only if the evaluation meets the established performance parameter standard. Allowing the call center agent to immediately play a game after completing a call, in which a performance parameter standard has been met, motivates the agent to continue to meet the performance parameter standard so that a game can be played again. In the preferred embodiment, a performance evaluation is conducted after each completed call and an interactive game is automatically delivered to an ACD agent computing device when a performance parameter standard is met.

21 Claims, 4 Drawing Sheets

|  | CONTEXT-DEPENDENT | CONTEXT-FREE |
|---|---|---|
| STAND-ALONE | e.g. Fill-in-the-Picture<br><br>(After each phone call, the agent gets to remove a piece of a puzzle that is covering a baby picture. Can be played in competitive mode in a "Guess the Baby" game.) | e.g. Slot Machine<br><br>(After each phone call, the agent gets to play a slot machine. Great for dealing out prizes "randomly.") |
| SOCIAL | e.g. Solve for the Phrase<br><br>(After each phone call, the agent picks a letter and tries to solve a phrase. Works well in competitive mode. | e.g. Trivia<br><br>(After each phone call, the agent gets to answer a multiple choice trivia question. Works well in cooperative mode.) |

FIG. 4

CALL CENTER INCENTIVE SYSTEM AND METHOD

TECHNICAL FIELD

The invention relates to call center systems and specifically to a call center system that provides incentives to motivate call center agents to at least meet a particular standard.

BACKGROUND ART

Many corporations provide services over the telephone, such as technical support, customer service, and direct sales. To maximize efficiency, corporations often perform repetitive telephone functions at centralized call centers. A typical call center has an automatic call distribution (ACD) system in place which distributes incoming or outgoing calls to ACD agents who are stationed at communications terminals. An ACD agent performing a call center function such as booking airline reservations may find the work to be repetitive and boring, leaving the agent unmotivated to service the next caller.

Providing incentives for agents to continually perform to a certain standard is not easy. Positive reinforcement and negative reinforcement are two possible categories of incentives that are used to encourage agents to conform their work habits to a particular standard. Common examples of negative reinforcement techniques used in employer/employee relationships include suspensions and demotions, and common examples of positive reinforcement techniques include pay raises, bonuses, and promotions.

Some tools exist to provide incentives specifically to employees who work as call center agents performing repetitive telecommunications business interactions. The existing tools typically carry out collection and reporting functions for a variety of ACD agent performance metrics, such as the number of calls handled per shift, the average call handling time, or the number of sales per hour. Call center managers then take the call system reports to either reward or punish call center agents based on the reported information. Use of most existing tools is a manual process which requires the call center manager to obtain reports, review the reports, compare the reports to reward/punishment criteria, and then contact the appropriate agent to communicate and deliver the appropriate reward/punishment. The full reward/punishment process may take days or weeks to complete using conventional systems, reducing the effectiveness of motivating the agent by linking specific actions with a reward or a punishment.

An example of a more automated tool used to motivate call center agents is disclosed in U.S. Pat. No. 5,239,460, entitled "Arrangement for Motivating Telemarketing Agents," issued to LaRoche. LaRoche discloses a method and arrangement for providing performance feedback to telemarketing agents by obtaining quantitative and qualitative measures of an agent's performance. Quantitative measures, such as the number of calls handled and dollar value of sales, are obtained electronically. However, qualitative measures, such as courteousness, professionalism, and accuracy of response, are obtained by a supervisor listening to a call and evaluating the agent's performance. The quantitative and qualitative measures are then multiplied together to generate a current indicator of a particular agent's overall performance. The current indicator of the agent's overall performance is fed, in the form of a scaled number, to the agent for viewing through the agent's telecommunications terminal. The performance indicator displayed on the agent's terminal is the only feedback provided to motivate the agent.

A disadvantage of the LaRoche system is that LaRoche requires a supervisor to listen to a call to grade the qualitative aspects of an agent's performance, thereby delaying the feedback obtained by the agent. Additionally, an agent may not be motivated by a performance indicator number being displayed at the agent's telecommunications terminal, especially when the performance indicator number is being used as a negative motivational incentive.

Another example of a tool used to provide incentives to call center agents is disclosed in U.S. Pat. No. 5,483,444, entitled "System for Awarding Credits to Persons Who Book Travel-Related Reservations," issued to Heintzeman et al. (hereinafter Heintzeman). Heintzeman discloses a computerized system that provides incentives for travel agents to book particular travel-related reservations. The system assigns a code to each participating travel agent to uniquely identify the agent. The system then awards credits to the travel agent identified by the code when the agent books a qualifying reservation. The system allows travel agents to build up credits over time based upon their bookings and then use the credits to receive a particular prize or award.

While the Heintzeman system may work well for its intended purpose, it is limited since the only motivational aspect of the system is the accumulation of credits for future prizes or awards. If the agent is not interested in the offered prize or if accumulating the necessary credits takes a significant amount of time, the agent may not be effectively motivated to book particular travel-related reservations.

What is needed is an improved method and system to provide more immediate positive incentives to call center agents to motivate the agents to conform their work habits to a particular standard without significant extra work by managers and supervisors.

SUMMARY OF THE INVENTION

The invention is a system and method that provide positive incentives to a call center agent by allowing the call center agent to play a game each time an established performance parameter standard is met. In accordance with the invention, a data collection system monitors a performance parameter of a telephone call handled by a call center agent. A game participation system compares a measure of the monitored performance parameter to an established performance parameter standard and allows the call center agent to participate in a game only if the performance measure meets the established performance parameter standard. Allowing the call center agent to immediately play a game after completing a call, in which a performance parameter standard has been met, motivates the agent to continue to meet the performance parameter standard so that a game can be played again.

The preferred incentive system utilizes an automatic call distribution system (ACD) to manage call distribution between a publicly switched telephone network and ACD agent computing devices (e.g. personal computers or network terminals). The ACD agent inputting devices may be comprised of a telephone having a headset apparatus for hands-free talking and a computer that is connected to a network database that is specific to the particular application. A performance-data collection system is connected to the ACD system to monitor different performance parameters of interactions conducted at the ACD agent computing devices. The game participation system is connected to the ACD and the performance-data collection system. The game participation system has a performance evaluation component and a game access component. The performance evaluation component compares monitored performance parameter data that is obtained by the performance-data collection system with established performance parameter standards. The game access component allows an ACD agent to participate in a game when the performance evaluation component determines that a performance measure meets the corresponding performance parameter standard. The game access component allows participation in the game by loading a graphical game interface onto the computing device of the ACD agent.

Optionally, the system and method accommodate supervisory input that increases the flexibility of the incentive program. For example, if a supervisor of a group of ACD agents randomly monitors calls, the supervisor preferably has the discretion to immediately award a prize or prize points to an ACD agent. An account is maintained for each ACD agent in order to track the prizes acquired by the ACD agents or the prize points (i.e., "currency") that are used to acquire prize items, monetary prizes or travel awards. The supervisor may automatically increment the account of the ACD agent in lieu of participation in a game or in addition to any awards acquired by the agent while participating in a game. Alternatively, the supervisor may set a bonus that is used in updating the account of the ACD agent only if the agent is successful during a game that immediately follows the monitored call. This hybrid of automatic game playing and discretionary award-giving may be implemented in various manners.

Operation of the preferred incentive system is described, for example purposes, as applied to a mail order catalog call center. In a mail order catalog call center, multiple calls are incoming into the ACD and each ACD agent is expected to handle many calls over the course of a work shift. An ACD agent may become tired or bored of handling the same type of calls throughout a work shift. However, with the incentive of being able to play a game whenever a performance parameter standard is met, an agent will be motivated to successfully complete calls.

As applied to the mail order catalog call center, the system first monitors at least one performance parameter of each call. In the example, there are two performance parameters, length of time of the call and revenue generated from the call. At the completion of a call by the ACD agent, the system automatically generates measurements of the two monitored performance parameters, length of time and revenue generated, and compares the performance measurements to established performance parameter standards. In the example, the two established performance parameter standards may be a maximum call time of seven minutes, and a minimum of $25 in revenue generated per call. If both of these standards are met, then the ACD agent who has conducted the business interaction is automatically allowed to participate in a game.

To allow the ACD agent to participate in a game, a graphical game interface is automatically loaded onto the computing device of the ACD agent. The ACD agent interacts with the computing device to play the short game. In the example, the ACD agent gets one pull on a computer displayed slot machine with the chance to win a prize or points that may be accumulated to obtain a prize. Preferably, there is a preset "time out" period and the "pull" is automatically initiated if the ACD agent does not trigger the game before the time out period expires. The ACD agent knows immediately if the ACD agent has won a prize or prize points. Whether or not the ACD agent has won a prize, the ACD agent will be motivated to handle another call in accordance with the performance parameter standard, so that the ACD agent has another chance to play the slot machine and potentially win a prize.

In an alternative embodiment, the incentive system has a game tracking component that tracks the progress of a player through a game that requires more than one interaction to complete. The player progresses through the game on an interaction-by-interaction basis. The game tracking component returns the player to the game at the same point at which the player had last left the game each time the player earns a chance to play. For example, the incentive system for the mail order catalog call center may allow an agent to play chess instead of a slot machine. In this case, the agent would get one move of a chess piece for each qualifying call that is completed and the system would maintain the continuity of the chess game throughout the game.

The incentive system is flexible in that many of the operational characteristics can be adjusted to motivate call center agents in accordance with specific needs. For example, the performance parameter standards are adjustable, the performance evaluation frequency is adjustable, numerous different games can be played, the mode of access to games can be adjusted, and various levels of interaction with games can be required.

In an Internet application of the incentive system, the game participation may be extended to either the agent or a customer of the business entity. A data connection is established between a computing device of the customer and a source of data that is specific to the business entity. Preferably, the source is a HyperText Transfer Protocol (HTTP) server and the data connection is a World Wide Web (WWW) link. In addition to the data connection, a voice connection is established between the customer and the agent of the business entity. The voice connection may be "immediate" in a sense that the customer may activate a hyperlink by means of WWW-page hypertext, thereby automatically connecting with the agent via the Internet Protocol (IP) connection to the web-site. Alternatively, the voice connection may be an agent callback in which the customer enters his or her phone number onto the WWW-page and submits the phone number to a request queue for a callback by an available agent.

The data connection preferably enables intercommunication between a computing device of the customer and a computing device of the agent. For example, desktop workstations of the customer and the agent may be aware of each other's IP address and may be concurrently viewing the WWW-page. With the data and voice connections established, a visual indication of the eligibility to a cost-free incentive may be displayed on the screen of one or both of the computing devices. In the application in which the agent is eligible, the concurrently viewed WWW-page may be manipulated to display a visual indicator that the customer is empowered to reward the agent if the agent provides quality service in handling the call. The reward may not be delivered until termination of the call, in order to avoid a rush to judgment on behalf of the customer. When the voice connection is terminated, the customer can provide the reward to the agent, if the service was satisfactory. The reward may be the ability to participate in a game of the type described above. Optionally, the eligibility of the agent to participate in the game may be based upon responses to an evaluation survey that is presented to the customer via the WWW link upon termination of the business transaction.

As an alternative or in addition to providing eligibility of the agent to a cost-free incentive, the customer may be eligible. After the data and voice connections are established, a WWW-page that is currently viewed by the agent and the customer may be manipulated to display eligibility to a cost-free reward to the customer at the termination of the business transaction. For example, the reward may be used as an incentive to complete an evaluation survey. In this embodiment, it is likely to be necessary to identify the customer within a network database of the system. For example, the customer may have an account number. Additionally, the reward preferably is delivered only after completion of the transaction, in order to avoid providing rewards for ineligible calls (e.g., nuisance calls). During the transaction, the agent is empowered to override the reward mechanism if the call is determined to be ineligible. The reward may or may not involve game playing.

An advantage of the invention is that games are designed to be enjoyable and that, when properly integrated into the work flow of a call center, they can change repetitive jobs from "work" into "play." In addition, games have winners and winning can be a powerful incentive to motivate people. Winning is even more powerful when coupled with the ability to receive "winnings" of some kind.

Another advantage is that the incentive system allows games to be won on the basis of not only performance, but luck. This means that anyone can win at any time, so that all agents are motivated to some extent, not just the best performers. In fact, game access can be awarded after every completion of a call regardless of call content, so that the "performance parameter standard" that must be met by the "performance measure" of the agent is the termination of a call.

Another advantage of the system is that it can be set up to operate automatically. Automatic operation allows agent rewards to be immediate. Moreover, the automatic operation of the system reduces the amount of time that management must spend implementing the incentive system and lessens the work required to obtain quantitative measurements of factors relating to agent performance. Depending upon the implementation, the system may promote teamwork among agents, e.g., groups of agents co-operate to reach a common goal.

BRIEF DESCRIPTION OF THE DRAWINGS

FIG. 4 is a game category matrix describing games that can be used in accordance with the invention.

DETAILED DESCRIPTION

Figure 1:
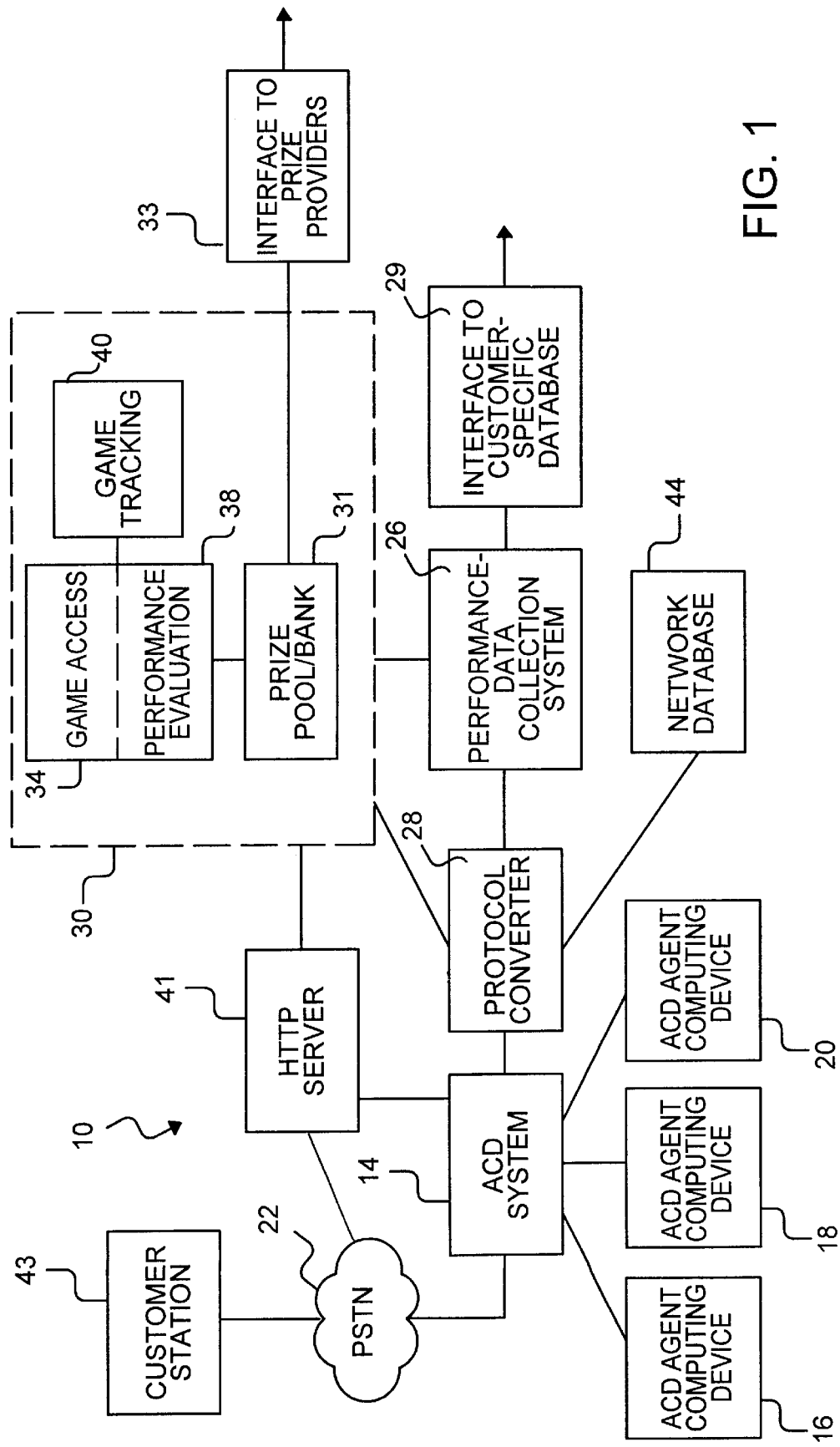
FIG. 1 is a block diagram of a call center incentive system in accordance with the present invention.

FIG. 1 is a block diagram of a call center incentive system 10 that depicts a preferred embodiment of the invention. At the center of the system is an automatic call distribution system (ACD) 14. The ACD, also known as a call center system, is a conventional ACD that manages the distribution of information, typically voice communications, in an environment in which multiple calls are incoming and/or outgoing between various ACD agents.

Multiple ACD agent computing devices are connected to the ACD, however only three computing devices 16, 18 and 20 are shown. In the preferred embodiment, each computing device is comprised of a telephone and a computer. Both the telephone and the computer are linked in a conventional data network such that the two devices can be used in tandem to perform various useful functions. For example, the telephone is typically used to carry on voice communications between an ACD agent and a customer. In many instances, the telephone is equipped with a headset so that the ACD agent can talk to a customer while using both hands to operate the computer or perform other tasks. The computer is typically connected to a company-specific network database 44 that provides information useful to an ACD agent in assisting a customer.

Although the preferred embodiment utilizes both a telephone and a computer, one or the other may be used separately in alternative embodiments. In addition, the telephone and computer do not have to be located physically near the ACD. Devices other than telephones and computers may be used in the system as long as communications between parties can be accomplished.

The ACD is also connected to a larger telecommunications network via, for example, a PBX or a central office of a telecommunications network. The larger network is typically the publicly switched telephone network 22 which allows the ACD agents at the ACD agent computing devices 16, 18 and 20 to communicate with customers using public or private telephones, thereby enabling business interactions to take place. One customer station 43 is shown in FIG. 1. The station is typically a conventional telephone, but the station requires WWW capability in the Internet application that will be described below.

A performance-data collection system (PDC) 26 is connected to the ACD 14 by conventional data network techniques, including the use of a conventional protocol converter 28. The PDC is a telecommunications-compatible system that collects and stores specified call-related information. The PDC can be programmed to monitor target performance parameters, or metrics, that are associated with each ACD agent's performance. For example, the PDC can monitor connection related metrics, such as the number of calls an agent completes per shift or the average time spent per call. Alternatively, the PDC may monitor sales metrics, such as sales revenue generated from a call by a particular agent, but in some applications this will require a connection to an interface 29 to a customer-specific database. The PDC stores the information in conventional databases for subsequent use. In addition to storing different types of information, the PDC may be able to identify trends in call activity, selectively sort call data, and produce customized reports based on stored performance data.

A game participation system (GPS) 30 is connected to the ACD 14 and to the PDC 26. The GPS is a telecommunications-compatible system that, in the preferred embodiment, has different components performing various functions. The first component is a performance evaluation component 38. The performance evaluation component takes information concerning at least one monitored performance metric and evaluates the monitored performance metrics against established performance metric standards. The performance metric standards used by the performance evaluation component are typically pre-established standards that are input by management as benchmarks for ACD agent performance. Evaluation may include comparing, for example, the number of calls an agent completes in an hour versus the number of calls an agent should complete during an hour or the evaluation may include tracking the amount of time that an ACD agent has worked versus a target work period.

The next component of the GPS 30 is a game access component 34. The game access component is the source of a game interface that can be accessed at the appropriate ACD agent computing device 16, 18, and 20. Preferably, the game interface is loaded onto an ACD agent device with both audio and visual components, but can be only one of an audio or visual component. The game interface is accessed at the ACD agent device via conventional techniques. In the preferred embodiment, the game access component automatically loads a game interface to an ACD agent computing device, thereby minimizing the time required to implement the motivation-enhancing system. However, in other embodiments the ACD agents must access the game interface through their computing devices.

A prize pool/bank 31 may be used to store prize information and agent account information. The prizes may be awarded based upon participation in a single game, e.g., winning an overnight stay in a local hotel upon winning a game. Alternatively, the prizes may be purchased by agents, using "currency" that is accumulated as the agents receive prize points during games. The agent account information in the prize pool/bank tracks the currency accumulated by each of the ACD agents. The prize pool/bank is connected to an interface 33 that links the system 10 to prize providers, such as hotels and airlines that are utilized for travel packages.

While not critical, the system 10 may be a hybrid of automatic game playing and discretionary award-giving by a supervisor. A supervisor or administrator of the system 10 may be enabled to increment an agent's account or to increase a potential game award (e.g., double all prize points for a particular game) based upon performance factors such as observed performance during a randomly monitored call or upon non-performance factors such as an observed motivational advantage to awarding a discretionary bonus.

Figure 2:
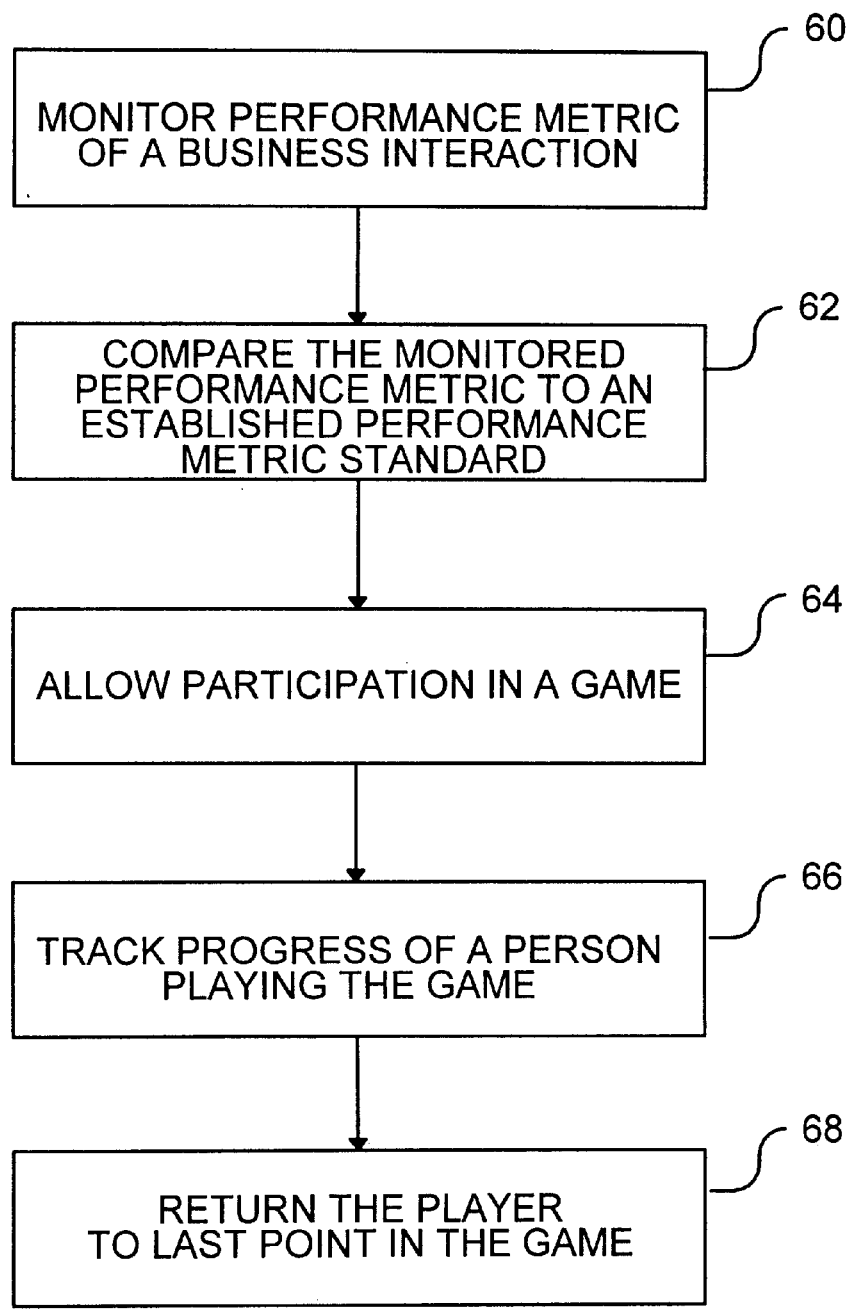
FIG. 2 is a method of providing positive incentives to a person conducting business interactions through a computing device in accordance with the present invention.

With all of the components of the preferred system introduced, operation of the preferred system is discussed with reference to FIGS. 1 and 2 in the context of an ACD agent application in which the ACD agent is answering incoming calls for a mail order catalog company. The ACD agent device 16 in the example has a headset-equipped telephone and a computer system that provides access to all necessary catalog ordering information. In the preferred embodiment, an ACD agent receives a call from a customer and proceeds to conduct a business interaction with the customer to provide the customer with the necessary services, while the PDC 26 portion of the system initiates the step 60 of monitoring a performance metric of the business interaction. For example purposes, it is assumed that two performance metrics are being monitored. The performance metrics, or parameters, that are being monitored are the length of time of the business interaction and total sales revenue generated from the interaction, as determined using the interface 29. When the interaction is complete, the results of the monitoring are stored in the PDC.

In the preferred embodiment, the evaluation function is executed by the performance evaluation component after every call that is fielded by an ACD agent. It is assumed for example purposes that the established performance metric standard for the length of time of a call is a maximum of seven minutes and the established performance metric standard for total sales revenue generated per call is $25. The completion of the call is determined using well known techniques of sensing the termination of a connection to the ACD system. The generated revenue is calculated based upon information acquired via the interface 29. Each time the ACD agent completes a call, the system initiates the step 62 of comparing the time spent on the call and the revenue generated from the call to the established standards to determine if the respective standards have been met by the ACD agent. If the ACD agent's call is completed in less than seven minutes and generates more than $25 in revenue, then the established performance standards have been met.

When the established performance standards have been met, the system instantly initiates the step 64 of allowing the ACD agent to participate in a game. During this time, the ACD system ensures that a next call connection is not made to the participating agent. The game access component of the system automatically performs the game access function and provides access to a graphical game interface at the ACD agent's computing device. In the preferred embodiment, the ACD agent is provided access to an interactive game such as a "slot machine." A prompt on the agent's computing device asks the ACD agent to "pull" the arm of the slot machine for a chance to win a prize. Preferably, a time out period is pre-set, so that the "pull" is automatically triggered if the ACD agent does not initiate the action before the time out period expires, so that the motivation-enhancing system does not significantly slow the ACD process. The ACD agent "pulls" the arm of the slot machine by directing a computer mouse pointer to a pull button and clicking on the pull button. If the slot machine "hits" the right combination of icons, the ACD agent wins a prize or "currency" for purchasing prizes. Confirmation of the results of playing the game is electronically sent to the ACD agent's computing device. Allowing the ACD agent to immediately play a game after completing a call in which the performance metric standards have been met is intended to motivate the ACD agent to continue to meet the performance metric standards so that the game can be played again.

An alternative method of monitoring a call center agent utilizing a call center system is described with reference to FIG. 3. In implementing this method, the computing devices that are used by the call center agents have voice communication and graphical display capability. The first step 80 in the method involves electronically monitoring a performance parameter related to a business communication that is conducted by a call center agent at a computing device. The next step 82 involves electronically comparing an evaluation of the monitored performance parameter to an established performance parameter standard at a designated frequency (e.g., once per call or once per hour). The next step 84 automatically loads a graphical game interface onto an agent's computing device when the evaluation of the performance parameter meets the established performance parameter standard. The next step 86 involves allowing the call center agent to play the game that corresponds to the graphical game interface by interacting with the agent's computing device.

Figure 3:
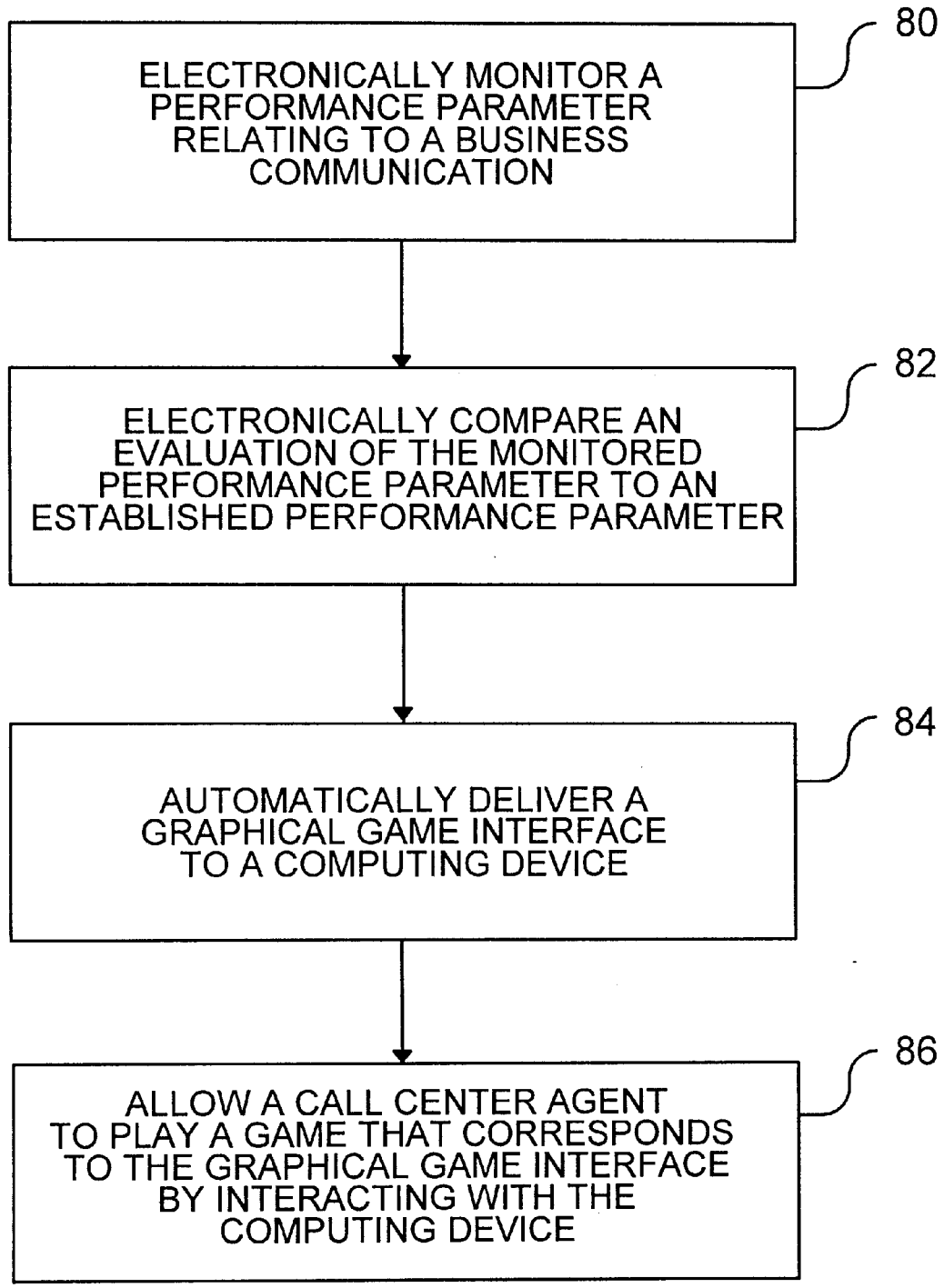
FIG. 3 is a method motivating a call center agent utilizing a call center system in accordance with the present invention.

In one implementation of the method of FIG. 3, persons are randomly or systematically polled following transactions with the call center agents. For example, randomly or systematically selected individuals may be requested to answer a sequence of questions that directly or indirectly relate to the communications with the agents. The number of questions should be sufficiently small so as not to discourage the individuals from responding to all of the questions in the sequence. Possible questions include, "On a scale of 1 to 5, with 5 being the best, are you satisfied with the service provided by the person to whom you spoke?" and "On the same scale, are you satisfied with the service of the company?" The responses to the questions are monitored, and in step 82, the evaluation monitored performance parameter is compared to a standard. In the example in which the polled individuals are asked to rate the service of the agent and the service of the company, the values of the responses may be added together and the sum may be compared with a pre-selected total to determine whether an agent is eligible for participating in a game. A second performance metric that may be electronically monitored in this example is the percentage of individuals who respond to the survey questions when asked to do so. An extremely low completion rate may be considered to be evidence of "agent intrusion," e.g., the agent may be suggesting that it is best not to respond to the survey questions. Bonus prize points may be awarded to agents having a response rate that exceeds a pre-established standard.

It should be recognized that there are many alternative embodiments of the invention, many of which will now be discussed. The first group of alternative embodiments involves the performance parameter standards that are established and corresponding performance parameters that are monitored. Performance parameter standards can be established for one or many aspects of an ACD agent's work. Examples of performance parameters for which standards can be established include the total number of calls completed, the number of calls completed per hour, revenue generated per completed call, revenue generated per minute of a call, customer satisfaction, problem solving success rate, and total time spent handling calls. Standards established for the performance parameters can be fixed or floating standards. A floating standard can vary by, for example, the time of day, where an agent is only expected to complete ten calls per hour from 3:00 to 4:00 PM, but is expected to complete fifteen calls per hour from 7:00 to 8:00 PM because customers are more likely to be available. Performance parameter standards can be changed as needed and performance parameters that are being monitored can be changed as needed.

In addition to changing the performance parameter standard that is used, the frequency of evaluation can be adjusted as needed. In the preferred embodiment, the monitored performance parameters are automatically compared to established performance metrics after each business interaction. However, any appropriate frequency can be used. For example, the monitored performance parameter can be evaluated on a work-completed basis, allowing game playing only after completing a certain number of calls. On the other hand, the monitored performance parameter can be evaluated on a length-of-time basis, allowing game playing only at certain time intervals, such as once per fifteen minutes, once per hour, or once per shift.

Another group of alternative embodiments involves the way in which access to the game is provided. Access to the game is preferably provided in an interactive form through a computer display screen. However, access to the game may be provided to the ACD agent in some other manner, such as an overhead display that can be viewed by a group of people, or the game may be delivered to the ACD agent only in an audio form through the ACD agents telephone headset (e.g., an audio presentation of trivia questions).

Another group of alternative embodiments involves the type of game that is played. The type of game that is played can vary widely to meet the specific needs of the system user. Games used in the system can be generally categorized based on three dimensions. The first dimension relates to whether the game is played alone or with a group and is categorized as "stand alone" versus "sociable." The second dimension relates to whether the agent competes against other agents or works with other agents on a common problem and is categorized as "cooperative" versus "competitive." The third dimension relates to whether the game is played in a single transaction or over several transactions and is categorized as "context free" versus "context dependent." FIG. 4 shows a game matrix 100 of the first and third dimensions with suggestions about the second dimension.

Referring to FIG. 4, an example of a stand-alone and context-dependent game is "Fill-in-the-Picture." To play the game, after each call the ACD agent is allowed to remove a piece of a puzzle that is covering a baby picture. The game can be played in the competitive mode in a "guess the baby" game. An example of a stand-alone and context-free game is a slot machine. To play the game, after each call the ACD agent has access to play a slot machine for a chance to randomly win a prize or prize points. An example of a social and context-dependent game is "solve for the phrase." To play the game, after each call the ACD agent picks a letter that might appear in a phrase and then tries to guess the phrase. The game works well in the competitive mode. An example of a social and context-free game is trivia. To play the game, after each call the ACD agent gets to answer a multiple-choice trivia question. The game works well in cooperative mode.

Although in the preferred embodiment the game is interactive, meaning the ACD agent must take some action to participate in the game, the game can also be non-interactive, where the game is automatically played for the ACD agent. An example of a non-interactive game could be a number matching game in which the ACD agent is given a random number at each game interval and the random number is automatically checked against a pre-selected winning number to determine if a prize has been won.

As previously noted, the system and method may allow a supervisor to award prizes or prize points on a discretionary basis. This may be implemented by awarding the prize or prize points in lieu of playing the game, by increasing potential prize points in playing the game (e.g., double all points that are acquired), or by providing access to the game and simultaneously increasing the accumulation of prize points of an ACD agent (as recorded in the prize pool/bank 31 in FIG. 1).

The type of prizes awarded to winners of games can range from the simple satisfaction of winning to substantial amounts of money, depending on the goal of the user. Available prizes can also be explained or highlighted in the prize pool/bank 31 that is accessible by the ACD agents. The prize pool/bank can contain information on the type of prize, the quantity of prizes, and the dispensations rules for prizes, as well as the accumulation of prize points by the agents.

Referring again to FIGS. 1 and 2, in games that are context-based, meaning the game continues over several transactions, a game tracking module 40 in the system is able to track 66 the progress of a player through a game and then return 68 the player back to the point in the game at which the person had last left the game.

Although the game is discussed in the preferred embodiment with respect to an ACD agent working as a sales agent, there are many other situations in which the system can be used. For example, the system can be applied to customer service agents and technical support agents in the same manner as it is applied to ACD sales agents. In fact, the system can be applied to any person who conducts business interactions through an equipped telecommunications system.

In addition to providing incentives to ACD agents, the system can be used to provide incentives to people who call into the system or are called by the system. For example, if a call center is conducting a survey by calling residential households, the incentive system can be set up to automatically provide an incentive for the called resident to complete the telephone survey. The incentive to the resident may be a chance to win a prize by randomly selecting a number or answering a trivia question. In another example, the system may offer a chance to play a game to any resident who calls into the system and completes a telephone survey. Providing incentives automatically through the call center system can make such incentive systems cost-effective to manage.

In addition to monitoring performance on an individual basis, the performance of a group of agents can be monitored and evaluated in order to motivate a group of agents to achieve a common goal.

The invention can also be implemented in an environment in which call center technology and Internet technology are integrated. In a possible scenario, a customer at the customer station 43 of FIG. 1 may be viewing a particular WWW-site using a web browser application on the computing device at the customer station. If the customer determines that an interaction with an agent of the business entity would be beneficial, the customer may take steps to initiate a voice connection in addition to the data connection to the WWW-site. Depending upon the technology that is used, the voice connection may be immediate or delayed. For an immediate connection, the customer may activate a hyperlink on the WWW-site to automatically connect to an agent. Typically, the immediate connection is an Internet Protocol (IP) connection to the WWW-site using the customer's computer audio hardware for audio input/output. This requires that the computing device at the customer station 43 include a sound card, a microphone, a speaker or headset, and the necessary telecommunications resources. The delayed connection may be implemented by a "blended" automated call distribution input queue, so that the customer enters his or her phone number via the data connection to the WWW-site and a callback request is queued for attention by the next-available agent.

In FIG. 1, the HTTP server 41 is shown as being connected directly to the game participation system 30 and directly to the ACD system 14, as well as the PSTN 22. However, the direct connections to the GPS 30 and the ACD system 14 are not critical to all Internet applications of the incentive system. In particular, it is not necessary for the HTTP server 41 to be on-site with the agents at the computing devices 16, 18 and 20, since the computing devices may access the WWW by means of public or private telecommunications resources.

Preferably, the customer and the agent are both linked to the HTTP server 41, so that the customer and agent can concurrently view the WWW-site. The computing device at the customer station 43 and the ACD agent computing device 16-20 are aware of each other's IP address. In addition to a data connection, there is a voice connection between the customer and the agent.

In an agent-reward application, the WWW-site that is concurrently viewed by the two parties is manipulated to display an indication that the customer is empowered to reward the agent. The reward is preferably deliverable only upon termination of the voice connection, thereby reducing the risk that the customer will rush to judgment. When the call is terminated, the customer can provide a reward to the agent if the service is determined to be satisfactory. For example, the agent may be enabled to participate in a game of the type described above. In one embodiment, the customer is presented with a sequence of questions of the type described above, e.g., "On a scale of 1 to 5, with 5 being the best, are you satisfied with the service provided by the person to whom you spoke?" The ability to participate in a game or to receive some other reward is then based upon the customer's responses to the survey.

In a customer-reward application, the WWW-site that is concurrently viewed by the customer and the agent is manipulated to display an indication that a reward may be presented to the customer. For example, the reward may be in return for completion of an evaluation survey. In this application, it is likely to be necessary to identify the customer within an account in the network database 44 of FIG. 1. Customer identification may be performed by collecting a "customer ID" during a callback process or by requiring the customer to input identification during the survey process. The customer reward should not be delivered until termination of the call, in order to avoid providing rewards for ineligible calls (e.g., nuisance calls). Thus, during the call, the agent can override the reward mechanism if the call is ineligible. Upon completion of the call, the customer may complete the survey, activate a "submit," and receive the reward, which may or may not involve participation in the game.

What is claimed is:

1. A method of providing positive incentives to a person conducting business interactions during operation of a computing device comprising the steps of:

electronically monitoring a performance metric of said business transactions conducted by said person operating said computing device;

electronically comparing said monitored performance metric of said business interactions to an established performance metric standard; and allowing said person to participate in a game based on said comparison when said monitored performance metric of said business interactions meets said established performance metric standard, including enabling access to said game via said computing device of said person.

2. The method of claim 1 wherein said substep of providing access to said game includes providing access to an interactive game via said computing device of said person and enabling said person to interact with said interactive game through said computing device.

3. The method of claim 2 wherein said substep of providing access to said interactive game includes providing access to a graphical portion of said interactive game via said computing device.

4. The method of claim 1 wherein said substep of electronically comparing said monitored performance metric against said established performance metric standard includes a substep of automatically comparing said monitored performance metric against said established performance metric standard after each one of said business interactions that is conducted by said person.

5. The method of claim 1 further including the steps of:

tracking the progress of said person through said game; and returning said person to said game at the point at which said person had last left said game each time said person is allowed to participate in said game, said person thereby being enabled to participate in said game in segments, said segments being continuations of said game and being accessible in a frequency that is determined by said steps of electronically monitoring and comparing.

6. An agent incentive system comprising:

communications means for allowing an agent to conduct communications with another person;

means, operatively connected to said communications means, for managing the distribution of said communications to and from said agent;

means, operatively connected to said managing means, for electronically monitoring a performance parameter of said communications that are conducted by said agent;

means, operatively connected to said monitoring means, for electronically evaluating said monitored performance parameter of said communications against a performance parameter standard; and means, operatively connected to said evaluating means, for engaging said agent in a game by operation of said communications means when said evaluation of said monitored performance parameter meets said performance parameter standard.

7. The system of claim 6 wherein said communications means for allowing said agent to conduct a communication with another person includes a computing device that has telecommunications capability and visual display capability.

8. The system of claim 7 wherein said engaging means includes a game-access connection to said computing device, said game-access connection allowing said game to be played from said computing device.

9. The system of claim 8 wherein said engaging means includes a source of said game wherein said game has a visual component that is viewed via said computing device.

10. The system of claim 7 wherein said means for managing the distribution of said communications includes an automatic call distribution system.

11. The system of claim 10 wherein said monitoring means includes an automated monitoring system connected to automatically monitor a performance parameter of said communications.

12. The system of claim 11 wherein said evaluating means includes an automated evaluation system connected to automatically evaluate said monitored performance parameter of said communications against said performance parameter standard after each one of said communications that is completed by said agent.

13. The system of claim 6 wherein said engaging means includes a source of an interactive game that is accessible via said computing device of said agent, wherein said interaction with said game is accomplished through said computing device.

14. The system of claim 13 further including a means, operatively connected to said engaging means, for tracking the progress of said agent with respect to said interactive game, wherein said interactive game is context-dependent.

15. A method of motivating a call center agent utilizing a call center system that includes a plurality of computing devices, where each computing device has voice communication capability and graphical display capability comprising the steps of:

electronically monitoring a performance parameter relating to at least one business communication that is conducted by said call center agent at one of said plurality of computing devices;

electronically comparing an evaluation of said monitored performance parameter to an established performance parameter standard at a designated frequency;

automatically delivering a graphical game interface to said computing device of said call center agent when said comparison between said evaluation of said monitored performance parameter and said performance parameter standard establishes that said performance parameter standard has been met; and allowing said call center agent to play a game that corresponds to said graphical game interface by interacting with said computing device, including enabling said call center agent to play said game either during a first business communication or immediately prior to a second business communication that follows said first business communication.

16. The method of claim 15 wherein said step of electronically comparing includes a substep of electronically comparing said evaluation of said monitored performance parameter to an established performance parameter standard after every business communication that is conducted by said call center agent.

17. A method of providing positive incentive to a person involved in a business interaction relating to a particular business entity comprising steps of:

establishing a data connection between a first computing device of a customer of said business entity and a source of data that is specific to said business entity and that is accessible to said customer via a browser application stored on said first computing device, said data connection being a network connection;

establishing a voice connection between said customer and an agent of said business entity, said agent having a second computing device;

determining whether said agent is eligible for participation in an agent-directed incentive mechanism of said business entity;

determining whether said customer is eligible for participation in a customer-directed incentive mechanism of said business entity; and based upon said determinations of eligibility, visually indicating to said customer via said data connection that at least one of said customer and said agent is eligible for a cost-free incentive that is based upon participation in said business interaction, including displaying a visual indicator of said eligibility on a screen of said first computing device.

18. The method of claim 17 wherein said steps of establishing said data and voice connections include forming a link via the Internet, said data connection being a World Wide Web link.

19. The method of claim 17 further comprising a step of enabling a first one of said customer and said agent to participate in a game, said participation in said game being said cost-free incentive.

20. A method of providing a positive incentive to a person involved in a business interaction relating to a particular business entity comprising steps of:

establishing a data connection between a first computing device of a customer of said business entity and a source of data that is specific to said business entity and that is accessible to said customer via a browser application stored on said first computing device, said data connection being a network connection;

establishing a voice connection between said customer and an agent of said business entity, said agent having a second computing device;

visually indicating to said customer via said data connection that at least one of said customer and said agent is eligible for a cost-free incentive that is based upon participation in said business interaction, including displaying a visual indicator of said eligibility on a screen of said first computing device; and enabling said agent to participate in a game, said game being said cost-free incentive for said agent, including basing eligibility of participation in said game upon activity by said customer.

21. The method of claim 20 wherein said customer is enabled to participate in said game, said method further comprising a step of enabling said agent to disable said eligibility of said customer to participate in said game.

* * * * *